(12) United States Patent
Li

(10) Patent No.: US 11,192,672 B2
(45) Date of Patent: Dec. 7, 2021

(54) BEAD WIRE WRAPPER DEVICE AND A WRAPPER METHOD

(71) Applicant: Shandong Daye Co., Ltd., Shandong (CN)

(72) Inventor: Wenjun Li, Shandong (CN)

(73) Assignee: SHANDONG DAYE CO., LTD., Shandong (CN)

( * ) Notice: Subject to any disclaimer, the term of this patent is extended or adjusted under 35 U.S.C. 154(b) by 325 days.

(21) Appl. No.: 16/343,959

(22) PCT Filed: May 31, 2018

(86) PCT No.: PCT/CN2018/089121
§ 371 (c)(1),
(2) Date: Apr. 22, 2019

(87) PCT Pub. No.: WO2019/184081
PCT Pub. Date: Oct. 3, 2019

(65) Prior Publication Data
US 2021/0171225 A1 Jun. 10, 2021

(30) Foreign Application Priority Data
Mar. 28, 2018 (CN) .......................... 201810265621.0

(51) Int. Cl.
*B65B 11/02* (2006.01)
*B65B 41/16* (2006.01)
(Continued)

(52) U.S. Cl.
CPC ............ *B65B 11/025* (2013.01); *B65B 41/16* (2013.01); *B65B 51/02* (2013.01); *B65B 61/06* (2013.01);
(Continued)

(58) Field of Classification Search
CPC ....... B65B 11/025; B65B 41/16; B65B 51/02; B65B 61/06; B65H 23/038; B65H 55/00;
(Continued)

(56) References Cited

U.S. PATENT DOCUMENTS 1,402,792 A * 1/1922 Pierce ..................... B65B 25/24
53/204
4,858,415 A * 8/1989 Hake ..................... B65B 11/045
53/438

(Continued)

*Primary Examiner* — Dariush Seif
(74) *Attorney, Agent, or Firm* — Chun-Ming Shih; Lanway IPR Services

(57) ABSTRACT

The present invention discloses a bead wire wrapper device and a wrapper method. The bead wire wrapper device comprises a rack body; the rack body is provided with a winding unit, an H-shaped wheel assembly, a paper cutting mechanism, a paper guiding mechanism and a rubber applying mechanism; the winding unit comprises a first winding shaft and a second winding shaft; the H-shaped wheel assembly comprises an H-shaped wheel and a drive unit driving the H-shaped wheel to rotate; the paper cutting mechanism is configured to cut off film materials directly or indirectly fed by the winding unit; the paper guiding mechanism comprises a motion mechanism, the motion mechanism is provided with an adsorption assembly and a pressing assembly, the adsorption assembly is configured to adsorb the film materials through negative pressure and send the cut-off tail ends of the film materials to the H-shaped wheel under the action of the motion mechanism, and the pressing assembly is configured to move to the H-shaped wheel under the action of the motion mechanism and press the film materials; and the rubber applying mechanism is configured to paste rubber strips to the film materials on the H-shaped wheel.

13 Claims, 1 Drawing Sheet

(51) Int. Cl.
  *B65B 51/02* (2006.01)
  *B65B 61/06* (2006.01)
  *B65H 23/038* (2006.01)
  *B65H 55/00* (2006.01)

(52) U.S. Cl.
  CPC .......... B65H 23/038 (2013.01); B65H 55/00 (2013.01); *B65H 2701/36* (2013.01)

(58) Field of Classification Search
  CPC ..... B65H 2701/36; B60C 15/04; B60C 15/06; D07B 2501/2053
  USPC .......................................................... 53/461
  See application file for complete search history.

(56) References Cited

U.S. PATENT DOCUMENTS

| | | | | |
|---|---|---|---|---|
| 5,035,372 A * | 7/1991 | Siebertz | ............... | B65H 59/388 242/420.5 |
| 5,941,473 A * | 8/1999 | Kawano | ............... | B65H 23/198 242/413.1 |
| 6,042,040 A * | 3/2000 | Kurita | ................... | B65H 59/18 242/365.7 |
| 9,527,694 B2 * | 12/2016 | Barea | ................... | B65H 59/388 |
| 9,533,461 B2 * | 1/2017 | Nishida | ................... | B29D 30/48 |
| 9,663,321 B2 * | 5/2017 | Barea | ................... | H01F 41/094 |
| 9,790,050 B2 * | 10/2017 | Johnson | ................ | B65H 57/14 |
| 9,919,894 B2 * | 3/2018 | Nishida | ................ | B65H 51/20 |
| 10,603,859 B2 * | 3/2020 | Takagi | ................... | B29D 30/48 |
| 10,807,335 B2 * | 10/2020 | Nomura | ................... | B29D 30/48 |
| 2001/0005975 A1 * | 7/2001 | Golightly | ............... | B65B 27/06 53/528 |
| 2009/0152388 A1 * | 6/2009 | Hinc | ...................... | B65H 51/20 242/155 R |
| 2009/0178757 A1 * | 7/2009 | Cocovi | ................ | B65H 59/388 156/117 |
| 2011/0030835 A1 * | 2/2011 | Morisaki | ................ | B29D 30/48 140/88 |
| 2014/0239115 A1 * | 8/2014 | Johnson | ................ | B29D 30/48 242/615.2 |
| 2015/0360902 A1 * | 12/2015 | Nishida | ................... | B65H 51/12 226/104 |
| 2017/0050818 A1 * | 2/2017 | Nomura | ................ | B65H 49/36 |
| 2018/0305171 A1 * | 10/2018 | Johnson | ................ | B65H 63/04 |

* cited by examiner

BEAD WIRE WRAPPER DEVICE AND A WRAPPER METHOD

TECHNICAL FIELD

The present invention relates to the field of wrapper devices, specifically to a bead wire wrapper device and a wrapper method.

BACKGROUND

As an important part of tires, bead wires are usually produced and supplied to tire manufacturers by bead wire manufacturers. In order to prevent the bead wires from being oxidized, the bead wires need strict sealing and wrapping after delivery. If they are exposed to the air, they will be oxidized, discoloured and rusted, etc., with the properties such as tensile strength and torsion reduced, thereby causing the wires to bond to rubber, decreasing the rubber adhesion ratio of the wires and affecting the quality of the wires. At present, using an H-shaped wheel for bead wire wrapper has become a trend. However, this work mainly depends on manual labour, which results in poor quality and inefficiency of bead wire wrapping. Therefore, it has become a common requirement for the industry to develop a special H-shaped wheel bead wire wrapper device.

SUMMARY

In view of the defects existing in the prior art, the present invention aims to provide a bead wire wrapper device and a wrapper method, which raise the bead wire wrapping efficiency and improve the bead wire wrapping quality.

To realize the above purposes, the present invention adopts the following technical solutions.

A bead wire wrapper device that includes a rack body; the rack body is provided with:

a winding unit, including a first winding shaft and a second winding shaft;

an H-shaped wheel assembly, including an H-shaped wheel and a drive unit driving the H-shaped wheel to rotate;

a paper cutting mechanism, configured to cut off film materials directly or indirectly fed by the winding unit;

a paper guiding mechanism, including a motion mechanism, where the motion mechanism is configured to be adapted to reciprocate in a first direction and a second direction; the first direction is a direction close to and away from the H-shaped wheel, while the second direction is a perpendicular direction; the motion mechanism is provided with an adsorption assembly and a pressing assembly; the adsorption assembly is configured to adsorb the film materials through negative pressure and send the cut-off tail ends of the film materials to the H-shaped wheel under the action of the motion mechanism; the pressing assembly is configured to move to the H-shaped wheel under the action of the motion mechanism and press the film materials; and a rubber applying mechanism, configured to paste rubber strips to the film materials on the H-shaped wheel.

The bead wire wrapper device of the present invention has the advantages of simple structure, easy operation, automatic wrapping, reduced manual labour, raised bead wire wrapping efficiency and improved bead wire wrapping quality.

Based on the above technical solution, the motion mechanism includes a crossed sliding table slide rest, which is disposed along the second direction, with the bottom connected to the rack body; and a guide rail, which is connected to the crossed sliding table slide rest, disposed along the first direction, and provided with a sliding block. The sliding block is capable of sliding in the first direction and the second direction to adjust the relative position between the motion mechanism and the H-shaped wheel.

Based on the above technical solution, the adsorption assembly and the pressing assembly are connected through a connecting rod; the connecting rod is disposed on the guide rail in a sliding manner; the connecting rod is connected to the sliding block. The sliding block moves to drive the connecting rod to move, so as to drive the adsorption assembly and the pressing assembly to move, thereby guaranteeing that the adsorption assembly adsorbs the film materials through negative pressure and sends the cut-off tail ends of the film materials to the H-shaped wheel under the action of the motion mechanism, and making sure that the pressing assembly moves to the H-shaped wheel under the action of the motion mechanism and presses the film materials.

Based on the above technical solution, the paper cutting mechanism includes a pneumatic paper cutter, which is disposed inside the paper cutting mechanism; and a paper bucket, fixed on the upper part of the pneumatic paper cutter, and including two paper feeding ports, which are respectively matched with the first winding shaft and the second winding shaft. The film materials wound on the first winding shaft and the second winding shaft enter the paper cutting mechanism respectively through the two paper feeding ports; the pneumatic paper cutter is configured to cut off the film materials in the paper feeding ports.

Based on the above technical solution, the drive unit is provided with a paper pressing mechanism; the paper pressing mechanism is driven by the drive unit to synchronously rotate with the H-shaped wheel.

Based on the above technical solution, the paper pressing mechanism includes:

a paper pressing rod, the one end of which is connected to the drive unit; and a pressing head, connected to the other end of the paper pressing rod, and configured to press the film materials onto the H-shaped wheel. The pressing head presses the film materials fed by the paper bucket onto the H-shaped wheel; driven by the drive unit, the paper pressing mechanism synchronously rotates with the H-shaped wheel to wind film materials on the H-shaped wheel, thereby wrapping a bead wire on the H-shaped wheel in the paper.

Based on the above technical solution, the rubber applying mechanism includes:

a material tray, disposed on one side of the rubber applying mechanism, and configured to wind a rubber material for applying;

a recycling winding tray, disposed at the bottom of the rubber applying mechanism, and configured to wind a used rubber stripe raw material for recycling;

a Z-axis direction adjusting hand crank, disposed at the top of the rubber applying mechanism, and configured to adjust the rubber applying mechanism to move close to and away from the H-shaped wheel in a vertical direction;

an X-axis direction adjusting hand crank, perpendicular to the Z-axis direction adjusting hand crank, and configured to adjust the movement of the rubber applying mechanism along the axial direction of the H-shaped wheel, so that after the adjustment in the Z-axis direction and X-axis direction, the rubber applying mechanism exactly applies the rubber to the film materials on the H-shaped wheel;

a rubber pressing rod, disposed on the other side of the rubber applying mechanism relative to the material tray, and provided with a rubber stripping board at the bottom, where the rubber stripping board pastes the rubber strips to the film materials on the H-shaped wheel under the action of the rubber pressing rod; the rubber pressing rod moves downwards, thereby driving the rubber stripping board to paste the rubber strips to the film materials on the H-shaped wheel; and a pulling mechanism, disposed between the rubber pressing rod and the recycling winding tray, and configured to pull the rubber stripe raw material to the recycling winding tray. The rubber stripe raw material is recycled to save the material cost.

Based on the above technical solution, the rack body is provided with at least one deviation correction system; the deviation correction system includes a deviation correction sensor, which is configured to detect the position of the film materials directly or indirectly fed by the winding unit; and a deviation correction drive unit, which is connected to the deviation correction sensor, and configured to drive the film materials to move along the width direction of the film materials. The deviation correction system solves the problem that the film materials are easy to deviate during the conveying process, with high control precision, and guarantees that the wound film materials are firm and are not easy to loosen.

Based on the above technical solution, the rack body is provided with two deviation correction systems; the two deviation correction systems are respectively matched with the first winding shaft and the second winding shaft; the two deviation correction systems are disposed at intervals along the height direction of the rack body. As each winding shaft is corresponding to a deviation correction system, the film materials used for bead wire wrapper both are corrected, thus further making sure that the different film materials are not easy to loosen after wrapping the bead wire, and guaranteeing the wrapping quality and precision.

Based on the above technical solution, two paper guide roll sets are disposed between the deviation correction systems and the winding unit; the two paper guide roll sets are respectively matched with the first winding shaft and the second winding shaft; the two paper guide roll sets are disposed at intervals along the height direction of the rack body. A paper guide roll set is correspondingly disposed between each winding shaft and the deviation correction system; the two paper guide roll sets may respectively convey the film materials on the first winding shaft and the second winding shaft to the corresponding deviation correction systems; the two paper guide roll sets do not interfere with each other.

Based on the above technical solution, each deviation correction system is connected with a paper feeding roll set; the paper feeding roll sets are disposed at intervals along the height direction of the rack body; the paper feeding roll sets are configured to convey the film materials sent by the deviation correction systems to the paper cutting mechanism. The paper feeding roll sets are connected to the deviation correction systems, and respectively feed the corrected film materials to the two paper feeding ports of the paper cutting mechanism; the two film materials are separated and do not interfere with each other.

A bead wire wrapper device, the bead wire wrapper device includes a rack body; the rack body is provided with:

a winding unit, disposed at one end of the rack body, and including a first winding shaft and a second winding shaft, which are disposed side by side at intervals;

a rubber applying mechanism, disposed at the other end of the rack body relative to the winding unit;

an H-shaped wheel assembly, disposed under the rubber applying mechanism, and including an H-shaped wheel and a drive unit driving the H-shaped wheel to rotate;

a paper cutting mechanism, disposed obliquely below the winding unit and close to the H-shaped wheel assembly; and a paper guiding mechanism, of which the top is connected to the paper cutting mechanism and the bottom is connected to the bottom of the rack body, and including a motion mechanism, where the top of the motion mechanism is connected to the paper cutting mechanism, and the motion mechanism is provided with an adsorption assembly and a pressing assembly.

The bead wire wrapper device of the present invention is used for bead wire wrapper so as to raise the bead wire wrapping efficiency and improve the bead wire wrapping quality.

A bead wire wrapper method performs bead wire wrapper using the above bead wire wrapper device. The whole bead wire wrapper method has simple process, high precision and high efficiency; the bead wire wrapping quality is improved, the wound film materials are firm and are not easy to loosen after wrapping, and the bead wire may be wrapped by two film materials, which do not interfere with each other during the packaging process; and the working process is rapid and efficient, automatic operation is realized, and manual labour is saved.

Compared with the prior art, the present invention has the following advantages:

(1) the bead wire wrapper device of the present invention includes a rack body; the rack body is provided with a winding unit, an H-shaped wheel assembly, a paper cutting mechanism, a paper guiding mechanism and a rubber applying mechanism; the winding unit includes a first winding shaft and a second winding shaft, which respectively wind two different film materials; the H-shaped wheel assembly includes an H-shaped wheel winding a bead wire and a drive unit driving the H-shaped wheel to rotate; the paper cutting mechanism is configured to cut off the film materials directly or indirectly fed by the winding unit; the paper guiding mechanism includes a motion mechanism; the motion mechanism is capable of moving close to and away from the H-shaped wheel, or moving in a perpendicular direction; the motion mechanism is provided with an adsorption assembly and a pressing assembly; the adsorption assembly is configured to adsorb the film materials through negative pressure and send the cut-off tail ends of the film materials to the H-shaped wheel under the action of the motion mechanism; the pressing assembly is configured to move to the H-shaped wheel under the action of the motion mechanism and press the film materials; the rubber applying mechanism is configured to paste rubber strips to the film materials on the H-shaped wheel; the bead wire wrapper device of the present invention is configured to bead wire wrapper so as to raise the bead wire wrapping efficiency and improve the bead wire wrapping quality; and (2) the rack body of the bead wire wrapper device of the present invention is provided with a deviation correction system, which solves the problem that the film materials are easy to deviate in the conveying process, with high control precision, and guarantees that the wound film materials are firm and are not easy to loosen.

and

Figure 2:
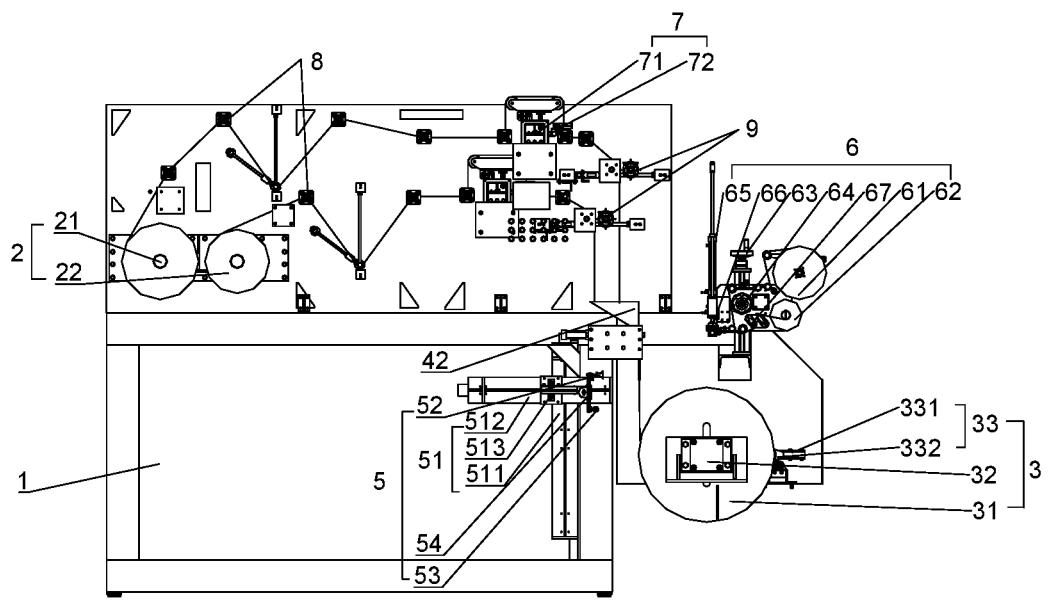

FIG. 2 is a front view of a bead wire wrapper device according to an embodiment of the present invention.

Figure 1:
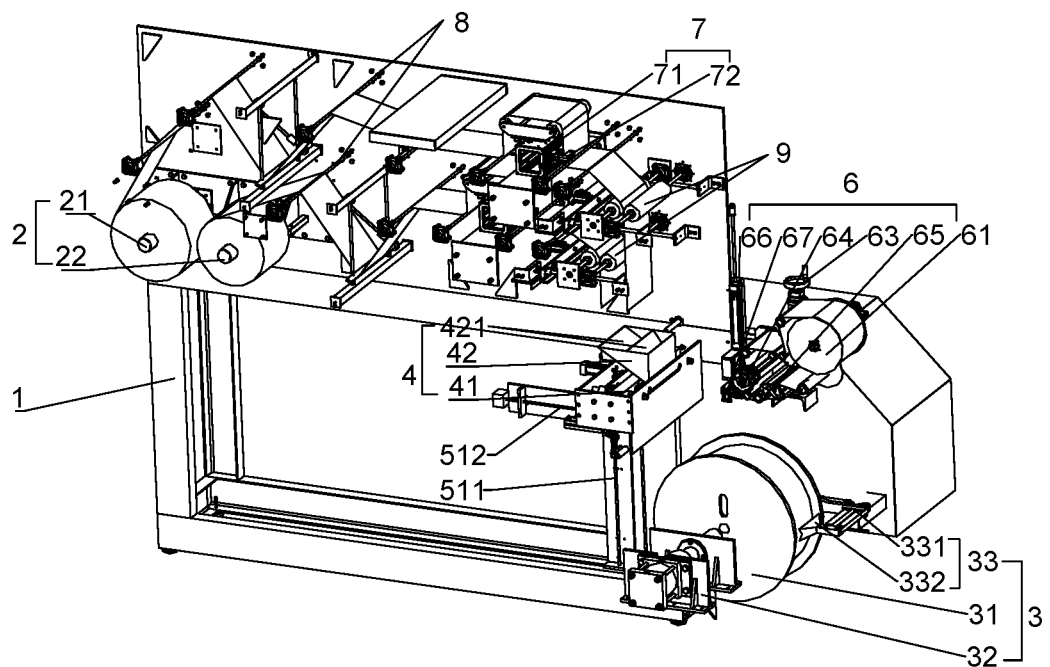
FIG. 1 is a three-dimensional structural schematic diagram of a bead wire wrapper device according to an embodiment of the present invention.

In FIG. 1: 1—rack body, 2—winding unit, 21—first winding shaft, 22—second winding shaft, 3—H-shaped wheel assembly, 31—H-shaped wheel, 32—drive unit, 33—paper pressing mechanism, 331—paper pressing rod, 332—pressing head, 4—paper cutting mechanism, 41—pneumatic paper cutter, 42—paper bucket, 421—paper feeding port, 5—paper guiding mechanism, 51—motion mechanism, 511—crossed sliding table slide rest, 512—guide rail, 513—sliding block, 52—adsorption assembly, 53—pressing assembly, 54—connecting rod, 6—rubber applying mechanism, 61—material tray, 62—recycling winding tray, 63—Z-axis direction adjusting hand crank, 64—X-axis direction adjusting hand crank, 65—rubber pressing rod, 66—rubber stripping board, 67—pulling mechanism, 7—deviation correction system, 71—deviation correction sensor, 72—deviation correction drive unit, 8—paper guide roll set, 9—paper feeding roll set;

In FIG. 2: 1: rack body; 2: winding unit; 21: first winding shaft; 22: second winding shaft; 3: H-shaped wheel assembly; 31: H-shaped wheel; 32: drive unit; 33: paper pressing mechanism; 331: paper pressing rod; 332: pressing head; 4: paper cutting mechanism; 41: pneumatic paper cutter; 42: paper bucket; 421: paper feeding port; 5: paper guiding mechanism; 51: motion mechanism; 511: crossed sliding table slide rest; 512: guide rail; 513: sliding block; 52: adsorption assembly; 53: pressing assembly; 54: connecting rod; 6: rubber applying mechanism; 61: material tray; 62: recycling winding tray; 63: Z-axis direction adjusting hand crank; 64: X-axis direction adjusting hand crank; 65: rubber pressing rod; 66: rubber stripping board; 67: pulling mechanism; 7: deviation correction system; 71: deviation correction sensor; 72: deviation correction drive unit; 8: paper guide roll set; 9: paper feeding roll set.

DETAILED DESCRIPTION OF THE EMBODIMENTS

The present invention is further described below with reference to the drawings and embodiments in detail.

Referring to FIG. 1 and FIG. 2, an embodiment of the present invention provides a bead wire wrapper device. The bead wire wrapper device includes a rack body 1; the rack body 1 is provided with: a winding unit 2, including a first winding shaft 21 and a second winding shaft 22, which respectively wind different film materials to wrap a bead wire in two layers; an H-shaped wheel assembly 3, including an H-shaped wheel 31 and a drive unit 32 driving the H-shaped wheel 31 to rotate, the H-shaped wheel 31 winding the bead wire; a paper cutting mechanism 4, configured to cut off the film materials directly or indirectly fed by the winding unit 2; a paper guiding mechanism 5, including a motion mechanism 51, where the motion mechanism 51 is configured to be adapted to reciprocate in a first direction and a second direction; the first direction is a direction close to and away from the H-shaped wheel 31; in the present embodiment, the first direction is a horizontal direction; the second direction is a perpendicular direction; in the present embodiment, the second direction is a vertical direction; the motion mechanism 51 is provided with an adsorption assembly 52 and a pressing assembly 53; the adsorption assembly 52 is configured to adsorb the film materials through negative pressure and send the cut-off tail ends of the film materials to the H-shaped wheel 31 under the action of the motion mechanism 51; the pressing assembly 53 is configured to move to the H-shaped wheel 31 under the action of the motion mechanism 51 and press the film materials; and a rubber applying mechanism 6, configured to paste rubber strips to the film materials on the H-shaped wheel 31. The bead wire wrapper device of the embodiment of the present invention has the advantages of simple structure, easy operation, automatic wrapping, reduced manual labour, raised bead wire wrapping efficiency and improved bead wire wrapping quality.

The motion mechanism 51 includes a crossed sliding table slide rest 511, which is disposed along the second direction, with the bottom connected to the rack body 1; and a guide rail 512, which is connected to the crossed sliding table slide rest 511, disposed along the first direction, and provided with a sliding block 513. The sliding block 513 is capable of sliding in the first direction and the second direction to adjust the relative position between the motion mechanism 51 and the H-shaped wheel 31.

The adsorption assembly 52 and the pressing assembly 53 are connected through a connecting rod 54; the connecting rod 54 is disposed on the guide rail 512 in a sliding manner; the connecting rod 54 is connected to the sliding block 513. The sliding block 513 moves to drive the connecting rod 54 to move, so as to drive the adsorption assembly 52 and the pressing assembly 53 to move, thereby making sure that the adsorption assembly 52 adsorbs the film materials through negative pressure and sends the cut-off tail ends of the film materials to the H-shaped wheel 31 under the action of the motion mechanism 51, and guaranteeing that the pressing assembly 53 moves to the H-shaped wheel 31 under the action of the motion mechanism 51 and presses the film materials.

The paper cutting mechanism 4 includes a pneumatic paper cutter 41, which is disposed inside the paper cutting mechanism 4; and a paper bucket 42, fixed on the upper part of the pneumatic paper cutter 41, and including two paper feeding ports 421, which are respectively matched with the first winding shaft 21 and the second winding shaft 22. The film materials wound on the first winding shaft 21 and the second winding shaft 22 enter the paper cutting mechanism 4 respectively through the two paper feeding ports 421; the pneumatic paper cutter 41 is configured to cut off the film materials in the paper feeding ports 421.

In the embodiment of the present invention, the drive unit 32 is provided with a paper pressing mechanism 33; the paper pressing mechanism 33 is driven by the drive unit 32 to synchronously rotate with the H-shaped wheel 31. The paper pressing mechanism 33 includes: a paper pressing rod 331, the one end of which is connected to the drive unit 32; and a pressing head 332, connected to the other end of the paper pressing rod 331, and configured to press the film materials onto the H-shaped wheel 31. The pressing head 332 presses the film materials fed by the paper bucket 42 onto the H-shaped wheel 31; driven by the drive unit 32, the paper pressing mechanism 33 synchronously rotates with the H-shaped wheel to wind the film materials on the H-shaped wheel 31, thereby wrapping the bead wire on the H-shaped wheel 31 in the paper.

The rubber applying mechanism 6 includes: a material tray 61, disposed on one side of the rubber applying mechanism 6, and configured to wind a rubber material for applying; a recycling winding tray 62, disposed at the bottom of the rubber applying mechanism 6, and configured to wind a used rubber stripe raw material for recycling; a Z-axis direction adjusting hand crank 63, disposed at the top of the rubber applying mechanism 6, and configured to adjust the rubber applying mechanism 6 to move close to and away from the H-shaped wheel 31 in a vertical direction; an X-axis direction adjusting hand crank 64, perpendicular to the Z-axis direction adjusting hand crank 63, and configured to adjust the movement of the rubber applying mechanism 6 along the axial direction of the H-shaped wheel 31, so that after the adjustment, the rubber applying mechanism 6 exactly applies the rubber to the film materials on the H-shaped wheel 31; a rubber pressing rod 65, disposed on the other side of the rubber applying mechanism 6 relative to the material tray 61, and provided with a rubber stripping board 66 at the bottom, where the rubber stripping board 66 pastes the rubber strips to the film materials on the H-shaped wheel 31 under the action of the rubber pressing rod 65; the rubber pressing rod 65 moves downwards, thereby driving the rubber stripping board 66 to paste the rubber strips to the film materials on the H-shaped wheel 31; and a pulling mechanism 67, disposed between the rubber pressing rod 65 and the recycling winding tray 62, and configured to pull the rubber stripe raw material to the recycling winding tray 62. The rubber stripe raw material is recycled to save the material cost.

In the embodiment of the present invention, the rack body 1 is provided with at least one deviation correction system 7; the deviation correction system 7 includes a deviation correction sensor 71, which is configured to detect the position of the film materials directly or indirectly fed by the winding unit 2; and a deviation correction drive unit 72, which is connected to the deviation correction sensor 71, and configured to drive the film materials to move along the width direction of the film materials. The deviation correction system solves the problem that the film materials are easy to deviate in the conveying process, with high control precision, and guarantees that the wound film materials are firm and are not easy to loosen.

The rack body 1 is provided with two deviation correction systems 7; the two deviation correction systems 7 are respectively matched with the first winding shaft 21 and the second winding shaft 22; the two deviation correction systems 7 are disposed at intervals along the height direction of the rack body 1. As each winding shaft is corresponding to a deviation correction system 7, the film materials used for bead wire wrapper both are corrected, thus further making sure that different film materials are not easy to loosen after wrapping the bead wire, and guaranteeing the wrapping quality and precision.

Two paper guide roll sets 8 are disposed between the deviation correction systems 7 and the winding unit 2; the two paper guide roll sets 8 are respectively matched with the first winding shaft 21 and the second winding shaft 22; the two paper guide roll sets 8 are disposed at intervals along the height direction of the rack body 1. A paper guide roll set 8 is correspondingly disposed between each winding shaft and the deviation correction system 7; the two paper guide roll sets 8 may respectively convey the film materials on the first winding shaft 21 and the second winding shaft 22 to the corresponding deviation correction systems 7; the two paper guide roll sets 8 do not interfere with each other.

Each deviation correction system 7 is connected with a paper feeding roll set 9; the paper feeding roll sets 9 are disposed at intervals along the height direction of the rack body 1; the paper feeding roll sets 9 are configured to convey the film materials sent by the deviation correction systems 7 to the paper cutting mechanism 4. The paper feeding roll sets 9 are connected to the deviation correction systems 7, and respectively feed the corrected film materials to the two paper feeding ports 421 of the paper cutting mechanism 4; the two film materials are separated and do not interfere with each other.

An embodiment of the present invention provides a bead wire wrapper device. Preferably, the bead wire wrapper device includes a rack body 1; the rack body 1 is provided with: a winding unit 2, disposed at one end of the rack body 1, and including a first winding shaft 21 and a second winding shaft 22, where the first winding shaft 21 and the second winding shaft 22 respectively wind different film materials to wrap a bead wire in two layers, the first winding shaft 21 and the second winding shaft 22 are disposed side by side at intervals, and the two film materials are separated and do not interfere with each other in the conveying process; a rubber applying mechanism 6, disposed at the other end of the rack body 1 relative to the winding unit 2, and configured to paste rubber strips to the film materials on the H-shaped wheel 31; an H-shaped wheel assembly 3, disposed under the rubber applying mechanism 6 to facilitate the rubber applying of the rubber applying mechanism 6 on the H-shaped wheel 31, and including an H-shaped wheel 31 and a drive unit 32 driving the H-shaped wheel 31 to rotate; a paper cutting mechanism 4, disposed obliquely below the winding unit 2 and close to the H-shaped wheel assembly 3, and configured to cut off the film materials directly or indirectly fed by the winding unit 2; a paper guiding mechanism 5, of which the top is connected to the paper cutting mechanism 4 and the bottom is connected to the bottom of the rack body 1, and including a motion mechanism 51, where the top of the motion mechanism 51 is connected to the paper cutting mechanism 4, and the motion mechanism 51 is capable of moving close to and away from the H-shaped wheel; in the embodiment of the present invention, the motion mechanism 51 moves in a horizontal direction or a perpendicular direction; in the embodiment of the present invention, the motion mechanism 51 moves in a vertical direction; the motion mechanism 51 is provided with an adsorption assembly 52 and a pressing assembly 53; the adsorption assembly 52 is configured to adsorb the film materials through negative pressure and send the cut-off tail ends of the film materials to the H-shaped wheel 31 under the action of the motion mechanism 51; the pressing assembly 53 is configured to move to the H-shaped wheel 31 under the action of the motion mechanism 51 and press the film materials. The bead wire wrapper device of the present invention is used for bead wire wrapper so as to raise the bead wire wrapping efficiency and improve the bead wire wrapping quality.

An embodiment of the present invention provides a bead wire wrapper method, performing bead wire wrapper using the above bead wire wrapper device, including the following steps:

S1. the first winding shaft 21 and the second winding shaft 22 respectively wind two different film materials; the paper guide roll set 8 corresponding to the first winding shaft 21 conveys one film material to the deviation correction system 7 corresponding to the first winding shaft 21, and the paper guide roll set 8 corresponding to the second winding shaft 22 conveys the other film material to the deviation correction system 7 corresponding to the second winding shaft 22; a paper guide roll set 8 is correspondingly disposed between each winding shaft and the deviation correction system 7; the two paper guide roll sets 8 may respectively convey the film materials on the first winding shaft 21 and the second winding shaft 22 to the corresponding deviation correction systems 7; the two paper guide roll sets 8 do not interfere with each other;

S2. the two deviation correction systems 7 respectively acquire the deviation directions of the two corresponding film materials and output corresponding deviation signals to the corresponding deviation correction sensors 71; according to the deviation signals of the deviation correction sensors 71, the corresponding deviation correction drive units 72 are controlled to act, thereby driving the film materials to move along the width direction of the film materials for correction; as each winding shaft is respectively corresponding to a deviation correction system 7, the two film materials both are corrected, thus further making sure that the different film materials are not easy to loosen after wrapping a bead wire, and guaranteeing the wrapping quality and precision;

S3. the two corrected film materials are conveyed to the paper feeding roll sets 9 connected to the deviation correction systems 7; the corresponding paper feeding roll sets 9 respectively convey the two film materials to the paper cutting mechanism 4 below; the two film materials enter the paper cutting mechanism 4 through the two paper feeding ports 421, where a film material is firstly conveyed from below the paper cutting mechanism 4 to the external circular surface of the H-shaped wheel 31, and is firstly used to wrap the H-shaped wheel 31; the other film material enters a paper feeding port 421 for further use; the two film materials do not interfere with each other, thereby guaranteeing the working efficiency and wrapping quality;

S4. the drive unit 32 is started to drive the paper pressing mechanism 33 to work; the paper pressing rod 331 drives the pressing head 332 to press the film material on the external circular surface of the H-shaped wheel 31 onto the surface of the bead wire on the H-shaped wheel 31; the paper pressing mechanism 33 and the H-shaped wheel 31 are driven by the drive unit 32 to synchronously rotate to wind the film material onto the surface of the bead wire on the H-shaped wheel 31; the pressing head 332 helps the H-shaped wheel 31 attach the film material to the H-shaped wheel 31, thereby making sure that the film material is not easy to fall off the H-shaped wheel 31, and guaranteeing smooth wrapping;

S5. when the H-shaped wheel 31 rotates to a certain position, the pneumatic paper cutter 41 works to cut off the film materials; the pneumatic paper cutter 41 is configured to cut off film materials, and is capable of cutting off the film materials rapidly and tidily;

S6. the sliding block 513 on the paper guiding mechanism 5 slides in horizontal and vertical directions to adjust the relative position between the motion mechanism 51 and the H-shaped wheel 31; the sliding block 513 moves to drive the connecting rod 54 to move, so as to drive the adsorption assembly 52 and the pressing assembly 53 to move; the adsorption assembly 52 adsorbs the film material through negative pressure and sends the cut-off tail end of the film material to the H-shaped wheel 31; the pressing assembly 53 moves to the H-shaped wheel 31 and presses the film material; the paper guiding mechanism 5 may smoothly and efficiently convey the cut-off tail end of the film material to the H-shaped wheel 31, so as to prepare for smooth subsequent rubber applying;

S6. the Z-axis direction adjusting hand crank 63 and the X-axis direction adjusting hand crank 64 on the rubber applying mechanism 6 are adjusted to enable the rubber stripping board 66 on the rubber applying mechanism 6 to face the cut-off tail end of the film material; the material tray 61 conveys rubber to the rubber stripping board 66; the rubber stripping board 66 pastes the rubber strips to the film materials on the H-shaped wheel 31 under the action of the rubber pressing rod 65; the pulling mechanism 67 pulls a rubber stripe raw material to the recycling winding tray 62; thus, the bead wire is successfully wrapped by the film material; and S7. the other film material is conveyed from below the paper cutting mechanism 4 to the external circular surface of the H-shaped wheel 31, and steps S4 to S6 are repeated to wrap the bead wire by the other film material.

The whole bead wire wrapper method has simple process, high precision and high efficiency; the bead wire wrapping quality is improved, the wound film materials are firm and are not easy to loosen after wrapping, and the bead wire may be wrapped by two film materials, which do not interfere with each other during the wrapping process; and the working process is rapid and efficient, automatic operation is realized, and manual labour is saved.

The present invention is not limited to the above embodiments. A person of ordinary skill in the technical field may make improvements and polishing without departing from the principle of the present invention; such improvements and polishing shall fall within the protection scope of the present invention. Those not described in detail in the specification shall be a prior art known to persons professionally skilled in the field.

The invention claimed is:

1. A film wrapping device for bead wire, comprising a rack body (1), wherein the rack body (1) is provided with:
   a winding unit (2), comprising a first winding shaft (21) and a second winding shaft (22);
   wheel assembly (3), comprising wheel (31) and a drive unit (32) driving the wheel (31) to rotate;
   a film cutting mechanism (4), configured to cut off a film material directly or indirectly fed by the winding unit (2);
   a film guiding mechanism (5), comprising a motion mechanism (51), where the motion mechanism (51) is configured to be adapted to reciprocate in a first direction and a second direction; the first direction is a direction close to and away from the wheel (31), while the second direction is a direction perpendicular to the first direction; the motion mechanism (51) is provided with an adsorption assembly (52) and a pressing assembly (53); the adsorption assembly (52) is configured to hold the film material by mean of negative pressure and send a cut-off tail end of the film material to the wheel (31) under the action of the motion mechanism (51); the pressing assembly (53) is configured to move to the wheel (31) under the action of the motion mechanism (51) and press the film material; and
   a rubber applying mechanism (6), configured to paste rubber strips to the film material on the wheel (31).

2. The film wrapping device according to claim 1, wherein the motion mechanism (51) comprises a crossed sliding table slide rest (511), which is disposed along the second direction, with the bottom connected to the rack body (1); and
   a guide rail (512), which is connected to the crossed sliding table slide rest (511), disposed along the first direction, and provided with a sliding block (513).

3. The film wrapping device according to claim 2, wherein the adsorption assembly (52) and the pressing assembly (53) are connected through a connecting rod (54); the connecting rod (54) is disposed on the guide rail (512) in a sliding manner; the connecting rod (54) is connected to the sliding block (513).

4. The film wrapping device according to claim 1, wherein the film cutting mechanism (4) comprises a pneumatic film cutter (41), which is disposed inside the film cutting mechanism (4); and
a film hopper (42), fixed on the upper part of the pneumatic film cutter (41), and comprising two film feeding ports (421), which are respectively matched with the first winding shaft (21) and the second winding shaft (22).

5. The film wrapping device according to claim 1, wherein the drive unit (32) is provided with a film pressing mechanism (33); the film pressing mechanism (33) is driven by the drive unit (32) to synchronously rotate with the wheel (31).

6. The film wrapping device according to claim 5, wherein the film pressing mechanism (33) comprises:
a film pressing rod (331), one end of which is connected to the drive unit (32); and
a pressing head (332), connected to the other end of the film pressing rod (331), and configured to press the film material onto the wheel (31).

7. The film wrapping device according to claim 1, wherein the rubber applying mechanism (6) comprises:
a material tray (61), disposed on one side of the rubber applying mechanism (6);
a recycling winding tray (62), disposed at the bottom of the rubber applying mechanism (6);
a Z-axis direction adjusting hand crank (63), disposed at the top of the rubber applying mechanism (6), and configured to adjust the rubber applying mechanism (6) to move close to and away from the wheel (31) in a vertical direction;
an X-axis direction adjusting hand crank (64), perpendicular to the Z-axis direction adjusting hand crank (63), and configured to adjust the movement of the rubber applying mechanism (6) along the axial direction of the wheel (31);
a rubber pressing rod (65), disposed on the other side of the rubber applying mechanism (6) relative to the material tray (61), and provided with a rubber stripping board (66) at the bottom, where the rubber stripping board (66) is configured to paste the rubber strips to the film material on the wheel (31) under the action of the rubber pressing rod (65); and
a pulling mechanism (67), disposed between the rubber pressing rod (65) and the recycling winding tray (62), and configured to pull a rubber stripe raw material to the recycling winding tray (62).

8. The film wrapping device according to claim 1, wherein the rack body (1) is provided with at least one deviation correction system (7); the deviation correction system (7) comprises a deviation correction sensor (71), which is configured to detect the position of the film material directly or indirectly fed by the winding unit (2); and
a deviation correction drive unit (72), which is connected to the deviation correction sensor (71), and configured to drive the film material to move along the width direction of the film material.

9. The film wrapping device according to claim 8, wherein the rack body (1) is provided with two deviation correction systems (7); the two deviation correction systems (7) are respectively matched with the first winding shaft (21) and the second winding shaft (22); the two deviation correction systems (7) are disposed at intervals along the height direction of the rack body (1).

10. The film wrapping device according to claim 8, wherein
two film guide roll sets (8) are disposed between the deviation correction systems (7) and the winding unit (2); the two film guide roll sets (8) are respectively matched with the first winding shaft (21) and the second winding shaft (22); the two film guide roll sets (8) are disposed at intervals along the height direction of the rack body (1).

11. The film wrapping device according to claim 10, wherein
each deviation correction system (7) is connected with a film feeding roll set (9); the film feeding roll sets (9) are disposed at intervals along the height direction of the rack body (1); the film feeding roll sets (9) are configured to convey the film material sent by the deviation correction systems (7) to the film cutting mechanism (4).

12. A film wrapping device for bead wire, wherein the bead wire wrapper device comprises a rack body (1); the rack body (1) is provided with:
a winding unit (2), disposed at one end of the rack body (1), and comprising a first winding shaft (21) and a second winding shaft (22), which are disposed side by side at intervals;
a rubber applying mechanism (6), disposed at the other end of the rack body (1) relative to the winding unit (2);
wheel assembly (3), disposed under the rubber applying mechanism (6), and comprising wheel (31) and a drive unit (32) driving the wheel (31) to rotate;
a film cutting mechanism (4), disposed obliquely below the winding unit (2) and close to the wheel assembly (3); and
a film guiding mechanism (5), of which the top is connected to the film cutting mechanism (4) and the bottom is connected to the bottom of the rack body (1), and comprising a motion mechanism (51), where the top of the motion mechanism (51) is connected to the film cutting mechanism (4), and the motion mechanism (51) is provided with an adsorption assembly (52) and a pressing assembly (53).

13. A film wrapping method for bead wire, wherein bead wire is wrapped using the film wrapping device according to claim 1.

* * * * *